United States Patent Office 3,324,225
Patented June 6, 1967

3,324,225
COMPOSITE HOSE UNIT FOR SUPPLYING A WELDING GUN WITH A WELDING WIRE OR WIRES, SHIELDING GAS, WELDING CURRENT AND COMPRESSED GAS
Harry Thostrup, Laxa, Sweden, assignor to Elektriska Svetsningsaktiebolaget, Goteborg, Sweden, a corporation of Sweden
Continuation of application Ser. No. 350,317, Mar. 9, 1964. This application Mar. 15, 1966, Ser. No. 542,983
Claims priority, application Sweden, Mar. 12, 1963, 2,680/63
1 Claim. (Cl. 174—47)

This application is a continuation of my application Ser. No. 350,317, filed Mar. 9, 1964, now abandoned.

The present invention relates to apparatus for gas-shielded metal arc welding of the type comprising a welding gun provided with a compressed-gas motor for advancing a welding wire or wires. More particularly, the invention relates to the flexible means required for the conveyance to the welding gun of the welding wire or wires, the shielding gas, the welding current and the compressed gas (usually compressed air).

It is a principal object of the invention to provide improved flexible means of the concentric composite tube or hose type which is terminated at both ends with fittings or connectors of improved construction serving to unite the various concentric members of the composite tube or hose into a single, coherent unit which is easily attachable to and detachable from the rest of the welding equipment.

This and other objects and advantages of the invention will appear more clearly from the following specification in connection with the accompanying drawings in which.

Figure 1:
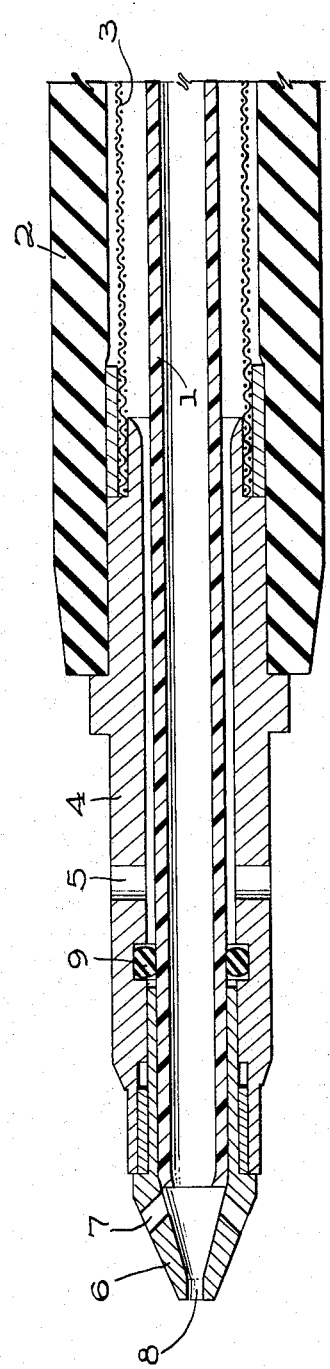
FIG. 1 is a sectional view of one end of a hose unit according to the invention, including a connector member fitted thereon.

The hose unit shown comprises an outer, flexible hose or tube 2, an inner, flexible tube or hose 1, and a plaited, hose-shaped welding current cable 3 disposed between the members 1 and 2. The outer hose or tube 2 may, for instance, consist of reinforced rubber. The inner hose or tube 1 may, for instance, consist of some suitable plastic, such as a polyamide or polytetrafluoroethylene. The space between members 1 and 2 forms a conduit for compressed air (or some other compressed gas) which serves as a driving agent for the compressed-air motor of the welding gun to be served by the hose unit. The compressed air also serves as a cooling agent for the cooling of the welding cable 3. The cable occupies only a minor part of the space between the members 1 and 2 and has a circumference slightly exceeding the mean circumference of the compressed-air conduit. The comparatively large cooled area of the cable effectively prevents overheating of the cable. The inner tube 1 serves as a conduit for shielding gas, for instance carbon dioxide, and also serves as a guide for the welding wire or wires (which occupy only a minor portion of the cross-sectional area of the hose 1).

The hose unit is provided at both ends with end pieces or fittings which serve to hold the three hose unit members in the proper axial position with regard to each other and which also serve as connector members facilitating the connecting of the hose unit to the welding gun and to the stationary part of the welding apparatus. The connector member fitted on the anterior end of the hose unit (FIG. 1), that is, the end which is adjacent to the welding gun, comprises a metal sleeve 4 attached at its rear end to the welding cable 3 and the outer hose 2 and provided with radial outlet holes 5 for the compressed air. The front end of the sleeve is fitted with a nipple 6 engaging the inner hose or tube 1 and provided with outlet holes 7 for the shielding gas as well as a central opening 8 for the welding wire. A sealing ring 9 arranged between the inner tube 1 and the sleeve 4 prevents leakage of compressed air. Suitable means on the welding gun for cooperating with the connector member just described are shown and described in United States Patent No. 3,196,249.

Figure 2:
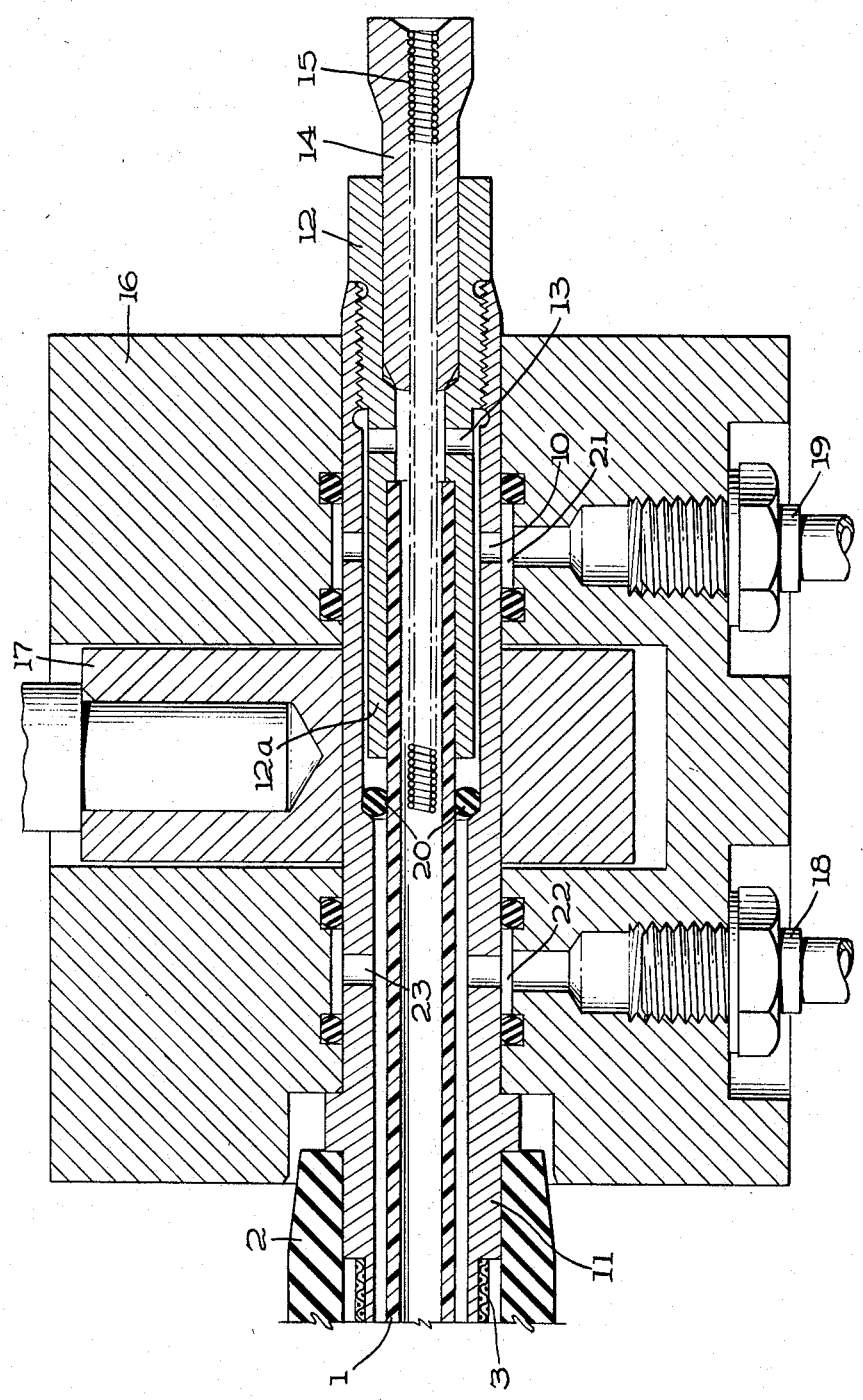
FIG. 2 is a sectional view of the other end of the hose unit and a connector member fitted thereon.

The connector member fitted on the rear end of the hose unit (FIG. 2) comprises a metal sleeve 11 attached at its anterior end to the outer hose 2 and the cable 3. A bushing 12 fitted in the rear extremity of the sleeve 11 is provided with a tubular forward extension 12a into which the rear end of the flexible inner tube or hose 1 is fitted. The passage or space enclosed between the inner wall of the sleeve 11 and the outer walls of the members 12a and 1 is subdivided by the annular sealing member 20 into a front passage and a rear passage. The front passage communicates freely with the compressed air conduit provided between the outer hose 2 and the inner hose, while the rear passage communicates with the interior of the extension 12a and the hose 1 through holes 13 in the wall of said extension. The portions of the sleeve 11 confining said front and rear passages are provided with inlet holes 23 and 10, respectively. A nipple 14 fittted into the bushing 12 has a bore lined with a wire spiral 15 of wear-resistant material, e.g. Phosphor bronze or beryllium bronze, said wire spiral serving both to take up the wear caused by the passage of the welding wire into the hose 1 through said bore and to form a substantially gas-tight seal between the bore and the welding wire to prevent appreciable loss of shielding gas. The anterior end of the wire spiral 15 extends into the hose 1 and may, if desired, extend the whole length of the hose 1 in order to protect it from wear.

The socket member 16 of the connector has a cylindrical bore adapted to receive the sleeve 11 of the plug member. The cylindrical bore is provided with two annular grooves 21, 22 facing, respectively, the holes 10 and 23 provided in the sleeve 11. Compressed air is discharged into the groove 21 from a source of supply through suitable conduits including connecting member 19, while shielding gas is discharged into the groove 22 from a source of supply through suitable conduits including connecting member 18. The contact clamp 17 is adapted to be connected to one terminal of a source of current and to grip the metal sleeve 11 in order to transmit the welding current to the same and also to secure the sleeve against axial displacement in the socket member.

I claim:

Flexible means for the conveyance to a welding gun of a welding wire or wires, shielding gas, welding current and compressed gas comprising an inner gas-tight flexible tube to conduct the shielding gas and the welding wire, an outer gas-tight flexible tube surrounding and spaced from said inner tube to conduct the compressed gas, a plaited hose-shaped wire cable for the welding current surrounding said inner tube and surrounded by said outer tube, and a plug-shaped connector member fitted to each end of said wire cable and both of said flexible tubes, each of said plug-shaped connector members having a coaxially disposed orifice for the welding wire and lateral, axially spaced openings for the shielding gas and the compressed air.

References Cited

UNITED STATES PATENTS

| 1,853,101 | 4/1932 | Von Henke | 174—19 |
| 3,196,249 | 7/1965 | Thostrup | 219—130 |

FOREIGN PATENTS

| 774,204 | 5/1957 | Great Britain. |

LARAMIE E. ASKIN, *Primary Examiner.*

J. RUGGIERO, *Assistant Examiner.*